Aug. 14, 1934.   C. B. EBRIGHT   1,969,784
DEPTH INDICATOR FOR LIQUIDS
Filed March 26, 1932
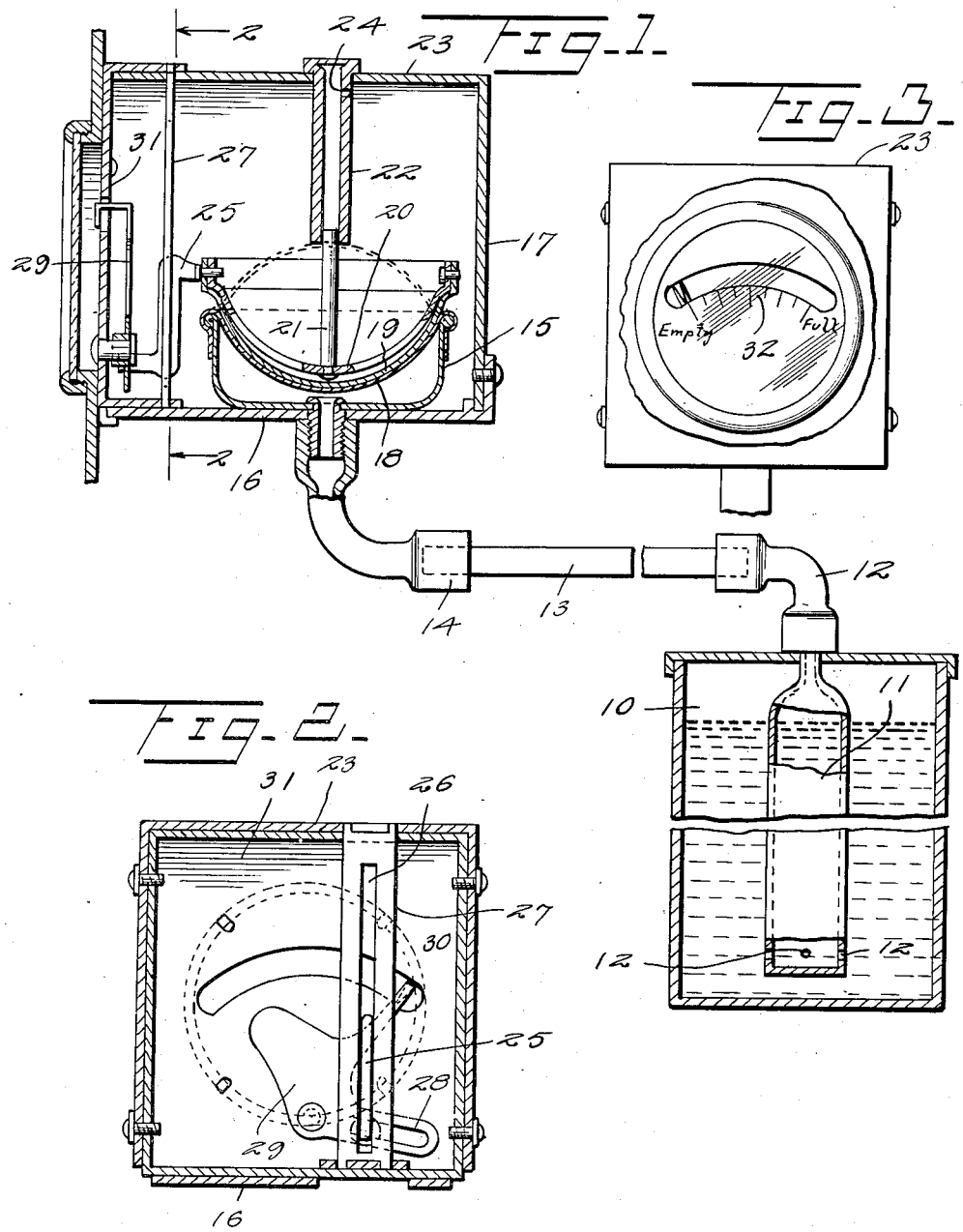
Inventor
C. B. Ebright
By Watson E. Coleman
Attorney Patented Aug. 14, 1934

1,969,784

UNITED STATES PATENT OFFICE 1,969,784

DEPTH INDICATOR FOR LIQUIDS

Clark Burton Ebright, Seattle, Wash.

Application March 26, 1932, Serial No. 601,387

2 Claims. (Cl. 73—110)

This invention relates to indicators for showing the depth of liquids in tanks, as for instance, the depth of gasoline in a gasoline tank of an automobile and particularly to depth indicators in which the indicator proper is at a distance from the tank.

The general object of the present invention is to provide an indicator of this character which is very simple, which may be easily applied and in which a diaphragm is actuated by the rise and fall of liquid in the tank to operate a pointer movable over a dial.

A further object is to provide an indicator of this character through which a column of air acts as a piston for moving the diaphragm.

Other objects will appear in the course of the following description.

My invention is illustrated in the accompanying drawing, wherein:—

Figure 1 is a vertical sectional view through my depth gauge and through a container with which the depth gage co-operates;

Figure 2 is a section on the line 2—2 of Figure 1;

Figure 3 is a face view of the gage.

Referring to the drawing, 10 designates a liquid tank of any suitable character such as the gasoline tank of an automobile or the like. Within this tank 10, there is disposed a tube 11 which may extend down to the bottom of the tank, that is, have a height equal to the height of the tank. This tube 11 has a series of small perforations 12 at its lower end. The upper end of the tube 11 is reduced in diameter and connected to an elbow 12 in turn connected by a pipe 13 to an elbow 14 which extends upward and opens into a chamber 15. This chamber 15 is mounted upon any suitable frame and is shown as mounted upon the base 16 of a frame which supports the gage. Disposed to extend across the upper portion of the chamber 15 and connected to the walls 17 thereof in any suitable manner is a diaphragm 18 which normally and when the gage is in a fully lowered position is depressed downward into the frame 17. Supported upon this diaphragm is a cup-shaped member 19 of metal or any other suitable material to the upper margin of which is attached the two arms of a yoke 20. Extending up from this yoke 20 is a guide spindle 21 operating through a tubular guide 22 extending downward from the upper element 23 of the frame, this tubular guide having an air hole 24 at its upper end.

Connected to one arm of the yoke 20 and to the rim of the cup-shaped member 19 is a link 25 moving in a slot 26 formed in a vertical guide 27 which extends from the member 23 to the member 16 of the frame and which is sprung into place. The lower end of the link 25 is angularly extended and connected to the slotted arm 28, the angular extension moving in the slot of this arm. This arm is carried by a pivoted element 29 having an outwardly projecting finger 30, this finger being extended outward through a dial 31 and moving over a series of graduations 32 on the face of the dial.

It is to be understood that the diaphragm 18 is freely movable vertically or, in other words, this diaphragm is not strained tight across the element 17 and is not under tension nor is its movement obstructed or resisted in any way except by the very light weight of the members 19, 20 and 21, the element 29 having its arm 28 counter-weighted so that it offers no resistance to movement. The diaphragm, therefore, in effect floats upon the air within the chamber 15 and as the air increases in the chamber 15, the diaphragm rises and eventually becomes somewhat inverted. This is not, therefore, an expansible diaphragm, but the diaphragm remains the same size throughout the action of the gage. It is much larger than the opening to the wall of which it is attached and merely changes its position.

The operation of the mechanism is as follows:—

As liquid rises within the tank 10, it will rise within the tube 11, thus forcing the air in the tube 13 upward and outward into the chamber 17, thus raising the loose diaphragm 18, lifting the cup-shaped member 19 and, of course, lifting the link 25. This acts to lift the arm 28 and shift the pointer over the graduations 32 so that when the tank is full, the pointer will so indicate and if the tank be empty, the pointer will indicate this fact.

It will be seen that my gage operates not by compressing the air to act against a strained or tight diaphragm but that it acts to "float" the diaphragm upward. The action is the same as though the "float" or diaphragm were moved directly by the liquid rising in a small column, the air merely acting to transmit this force to the diaphragm. The volume of the tube in the tank equals the volume of the cup or chamber 17 closed by the diaphragm when the diaphragm is at its highest point.

The size of this small column of liquid is such that the weight of the liquid of the column equals the weight of the float plus the weight of liquid necessary to move the float the desired distance. The diaphragm merely serves the purpose of preventing the air moved by liquid from escaping.

I claim:—

1. In a pressure indicator, a chamber having a freely movable diaphragm extending across its upper end, the diaphragm normally extending downward into said chamber, the chamber having an inlet, a cup-shaped member resting upon the diaphragm, a vertical guide for the cup-shaped member, a link attached at its upper end to the cup-shaped member and extending downward and then outward, a vertical guide between which said link moves, a pivoted element having two arms, one of said arms being slotted and the outwardly extending end of the link engaged in said slot, the other end of the arm constituting a pointer, and a dial over which said pointer moves.

2. In a pressure indicator, a chamber having a freely movable diaphragm extending across its upper end, the diaphragm normally extending downward into said chamber, the chamber having an air inlet below the diaphragm, a member resting upon the diaphragm and vertically movable therewith, a dial, a pivoted pointer movable over the dial, the pointer having a radially extending arm, a vertical guide, a link movable in said guide and operatively engaging the arm of the pointer and having sliding movement thereon, the link at its other end being connected to said member, and a counter-weight on the pointer urging said arm, link and member upward.

CLARK BURTON EBRIGHT.